United States Patent
Omichi et al.

(10) Patent No.: US 8,821,767 B2
(45) Date of Patent: Sep. 2, 2014

(54) CATHODE ACTIVE MATERIAL

(71) Applicant: Honda Motor Co., Ltd., Tokyo (JP)

(72) Inventors: Kaoru Omichi, Wako (JP); Yuji Isogai, Wako (JP); Yuki Ito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/962,353

(22) Filed: Aug. 8, 2013

(65) Prior Publication Data
US 2014/0054517 A1  Feb. 27, 2014

(30) Foreign Application Priority Data
Aug. 23, 2012 (JP) .................. 2012-183877

(51) Int. Cl.
*H01B 1/02* (2006.01)
*H01M 4/58* (2010.01)
*H01M 10/052* (2010.01)

(52) U.S. Cl.
CPC ............ *H01M 4/582* (2013.01); *H01M 10/052* (2013.01)
USPC ....................................... 252/519.1

(58) Field of Classification Search
CPC ............... C01P 2006/40; Y02E 60/122
USPC ....................................... 252/519.1
See application file for complete search history.

(56) References Cited

U.S. PATENT DOCUMENTS

2010/0035155 A1*  2/2010  Okada et al. ............ 429/221

FOREIGN PATENT DOCUMENTS

JP  2008-130265  6/2008

* cited by examiner

*Primary Examiner* — Khanh T Nguyen
*Assistant Examiner* — Danny N Kang
(74) *Attorney, Agent, or Firm* — Rankin, Hill & Clark LLP

(57) ABSTRACT

A cathode active material is provided by which excellent charge and discharge properties in a high-current range can be obtained when used in non-aqueous electrolyte secondary batteries. The cathode active material consists of a mixed metal fluoride represented by the general formula $Fe_{(1-x)}M_xF_3$. M is a metal element selected from the group consisting of Y, Mn, Cu, Zn, and Cr. x is $0.01 \leq x \leq 0.15$.

1 Claim, 2 Drawing Sheets

CATHODE ACTIVE MATERIAL

BACKGROUND OF THE INVENTION

1. Field of the Invention

The present invention relates to a cathode active material.

2. Description of the Related Art

Non-aqueous electrolyte rechargeable secondary batteries are conventionally used as secondary batteries for electric automobiles. The secondary batteries for automobiles are used in a high-current range during driving at high speed or climbing. Thus, it is desirable that the secondary batteries for automobiles, in addition to their high capacity, have excellent charge and discharge properties in a high-current range.

Metal fluorides represented by the general formula $MF_3$ are known to be used as cathode active materials for the non-aqueous electrolyte secondary batteries. See Japanese Patent Laid-Open No. 2008-130265. M in the $MF_3$ is a metal element selected from the group consisting of Fe, V, Ti, Co, and Mn.

The metal fluorides represented by the general formula $MF_3$ are known to have a high theoretical energy density (reversible capacity). For example, a non-aqueous electrolyte secondary battery using $FeF_3$ as a cathode active material and Li as an anode active material is considered to have a theoretical energy density of about 240 mAh/g.

However, since the metal fluorides represented by the general formula $MF_3$ are electrically insulating, the electromotive force of non-aqueous electrolyte secondary batteries using the metal fluoride as a cathode active material is reduced during recharging and discharging in a high-current range. Such reduction disadvantageously makes it difficult for the batteries to generate high-capacity energy.

SUMMARY OF THE INVENTION

The present invention has been made to eliminate such a disadvantage and aims to provide a cathode active material by which excellent charge and discharge properties in a high-current range can be obtained when used in non-aqueous electrolyte secondary batteries.

In order to achieve such an object, the present invention provides a cathode active material used for secondary batteries comprising a non-aqueous electrolyte, wherein the cathode active material consists of a mixed metal fluoride represented by the general formula $Fe_{(1-x)}M_xF_3$ where M is a metal element selected from the group consisting of Y, Mn, Cu, Zn, and Cr.

According to the present invention, when a part of Fe in $FeF_3$ is substituted by a metal element selected from the group consisting of Y, Mn, Cu, Zn, and Cr to provide a mixed metal fluoride, the band gap of the mixed metal fluoride becomes smaller than that of $FeF_3$. Consequently, conductivity can be imparted to the mixed metal fluoride. Thus, when the mixed metal fluoride is used as a cathode active material in non-aqueous electrolyte secondary batteries, the non-aqueous electrolyte secondary batteries can achieve excellent charge and discharge properties in a high-current range.

In the cathode active material of the present invention, it is preferable that x in the general formula $Fe_{(1-x)}M_xF_3$ of the mixed metal fluoride is in the range of $0.01 \leq x \leq 0.15$. The mixed metal fluoride can stably exist when x is within the range. If x is less than 0.01, the effect to reduce the band gap of the mixed metal fluoride may not be sufficiently achieved. In contrast, if x exceeds 0.15, the mixed metal fluoride may not stably exist.

DETAILED DESCRIPTION OF THE PREFERRED EMBODIMENTS

Embodiments of the present invention will now be further described in detail by referring to the accompanying drawings.

A cathode active material of this embodiment is a mixed metal fluoride obtained by substituting a part of Fe in $FeF_3$ by an other metal element, wherein the mixed metal fluoride is represented by the general formula $Fe_{(1-x)}M_xF_3$. In the general formula $Fe_{(1-x)}M_xF_3$, M is a metal element selected from the group consisting of Y, Mn, Cu, Zn, and Cr, and x is in the range of $0.01 \leq x \leq 0.15$.

$FeF_3$ is electrically insulating. However, the mixed metal fluoride $Fe_{(1-x)}M_xF_3$, which is obtained by substituting a part of Fe in $FeF_3$ by the metal element, has a band gap smaller than that of $FeF_3$ and electrically conductive.

Figure 1:
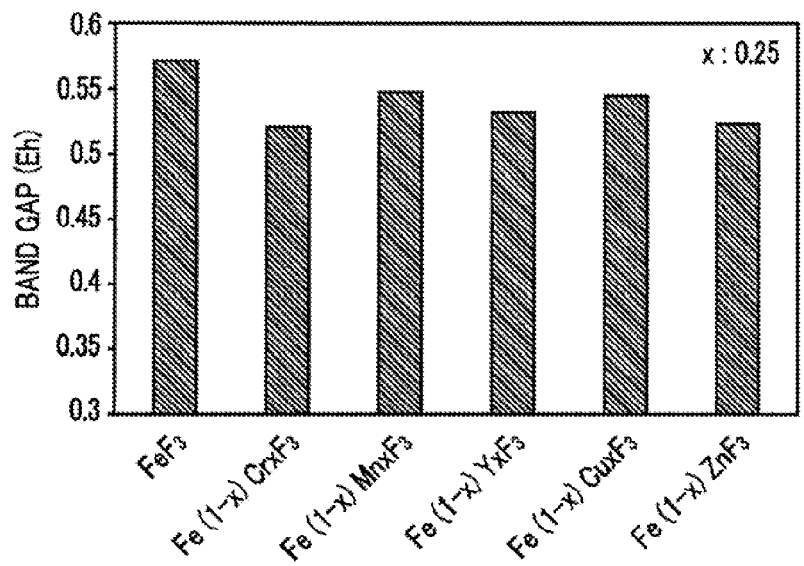
FIG. 1 is a graph showing the estimated band gaps of the mixed metal fluorides according to the present invention.

FIG. 1 shows the results of band gap calculations for $FeF_3$ and the mixed metal fluorides $Fe_{(1-x)}M_xF_3$ which were based on the first-principles calculation using a cluster model. It is clear from FIG. 1 that the mixed metal fluorides $Fe_{(1-x)}M_xF_3$ have band gaps smaller than that of $FeF_3$.

The mixed metal fluorides $Fe_{(1-x)}M_xF_3$ can be prepared, for example, as follows:

First, iron nitrate and a nitrate including the ion of the metal element M are dissolved in a solvent such as a mixed solvent of water and ethanol to prepare a first solution. If the ion of the metal element M is set to the range from 1 to 15% by mass based on the iron ion, x in the general formula $Fe_{(1-x)}M_xF_3$ can be set to the range of $0.01 \leq x \leq 0.15$.

Next, ammonium hydrogen fluoride and ethylene glycol are dissolved in a solvent such as ethanol and water to prepare a second solution. Each of ammonium hydrogen fluoride and ethylene glycol can be brought to a concentration of 15 to 25% by mass in the second solution.

Subsequently, the first solution ranging from 50 to 300 g is slowly added dropwise to the second solution ranging from 20 to 150 g to allow reaction to occur. After dropwise addition of the first solution is completed, the reaction solution is stirred for 2 to 4 hours and the precipitate is filtered under reduced pressure to provide a product. The resulting product is again dispersed in an ethanol solution and filtered under reduced pressure to wash and remove ethylene glycol contained in the product.

The resulting product is dried under reduced atmosphere of 1 to 50 kPa within the temperature range of 70 to 90° C. for 12 to 24 hours to provide an intermediate of the mixed metal fluoride represented by the general formula $Fe_{(1-x)}M_xF_3$. The intermediate is a powder of the compound represented by the general formula $(NH_4)_3Fe_{(1-x)}M_xF_6$.

Then, the mixed metal fluoride represented by the general formula $Fe_{(1-x)}M_xF_3$ can be obtained by calcining the intermediate under an inert atmosphere such as argon within the temperature range of 350 to 500° C. for 0.5 to 2 hours.

The mixed metal fluoride represented by the general formula $Fe_{(1-x)}M_xF_3$, which serves as a cathode active material, can form a non-aqueous electrolyte secondary battery along with a metal such as Li or Na, which serves as an anode active material, and a non-aqueous electrolyte solution including a supporting electrolyte such as $LiPF_6$.

Examples and comparative examples of the present invention will now be described.

Example 1

In this example, iron nitrate and manganese nitrate, with the manganese ion content set to 5% by mass based on the mass of iron ions, were dissolved in a mixed solvent containing water and 25% by mass of ethanol to prepare a first solution. The total concentration of iron nitrate and manganese nitrate was 0.05 mol/l based on the mixed solvent. Then, each of ammonium hydrogen fluoride and ethylene glycol was dissolved at 20% by mass in water to prepare a second solution.

Then, 210 g of the first solution was slowly added dropwise to 120 g of the second solution to allow reaction to occur. After dropwise addition of the first solution was completed, the reaction solution was stirred for 3 hours and the precipitate was filtered under reduced pressure to provide a product. The resulting product was again dispersed in an ethanol solution and filtered under reduced pressure to wash and remove ethylene glycol contained in the product.

The resulting product was dried under reduced atmosphere of 1 kPa at 80° C. for 16 hours to provide a powder of the compound represented by $(NH_4)_3Fe_{(1-x)}Mn_xF_6$ as an intermediate. Then, the intermediate was calcined under an argon atmosphere at the temperature of 400° C. for 1 hour to provide a powder of the mixed metal fluoride represented by the general formula $Fe_{(1-x)}Mn_xF_3$.

Subsequently, the powder of the mixed metal fluoride obtained in this example was analyzed with a scanning electron microscope with energy dispersive X-ray analysis (SEM-EDX) and an inductively coupled plasma atomic emission spectrometer (ICP-AES) and identified as $Fe_{0.96}Mn_{0.04}F_3$. Table 1 shows the metal by which a part of Fe was substituted and the value of x for the mixed metal fluoride obtained in this example.

Figure 2:
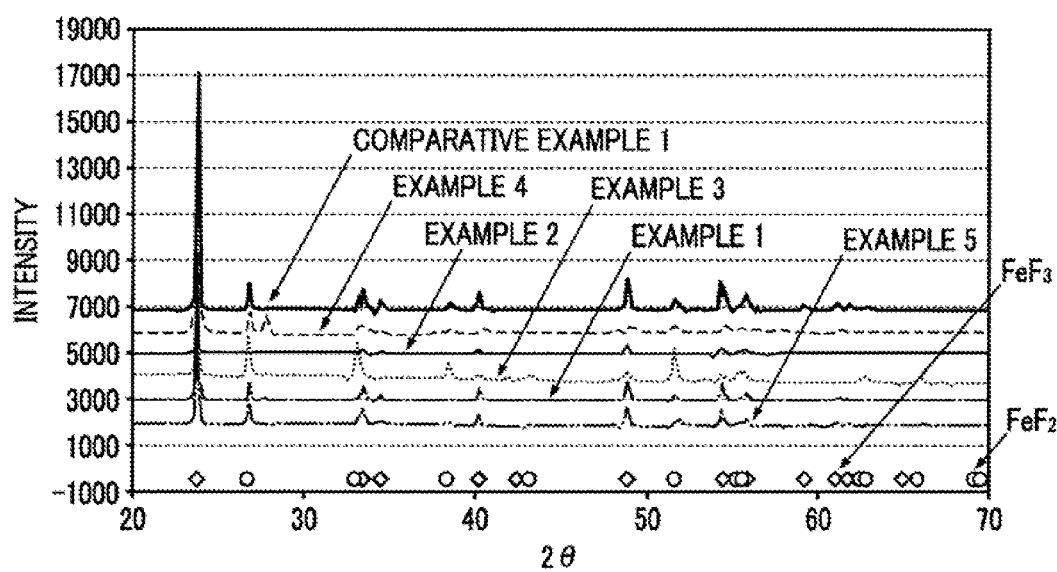
FIG. 2 is a graph showing the X-ray diffraction spectra of the mixed metal fluorides according to the present invention.

Then, the crystalline structure of the powder of $Fe_{0.96}Mn_{0.04}F_3$ was examined by X-ray diffraction. The result is shown in FIG. 2. It is clear from FIG. 2 that the powder of $Fe_{0.96}Mn_{0.04}F_3$ obtained in this example has a crystalline structure in which a part of Fe in $FeF_3$ having a perovskite structure has been substituted by Mn.

Next, a non-aqueous electrolyte secondary battery was produced using the powder of $Fe_{0.96}Mn_{0.04}F_3$ obtained in this example as a cathode active material.

In producing the non-aqueous electrolyte secondary battery, the powder of $Fe_{0.96}Mn_{0.04}F_3$ obtained in this example and Ketjenblack (Lion Corporation, trade name: EC600JD) were mixed in a mass ratio of 7:3. Then, 30 mg of the resulting mixture and 3.45 mg of polytetrafluoroethylene were mixed and formed into a pellet with a diameter of 15 mm and a thickness of 0.5 mm in a powder compacting press to provide a cathode active material. The cathode active material was bonded with a charge collector having a diameter of 15 mm and composed of an aluminum mesh to provide a cathode.

Subsequently, a Li foil with a diameter of 15 mm and a thickness of 0.1 mm was bonded to a charge collector in which an SUS mesh with a diameter of 15 mm was welded to an SUS plate with a diameter of 15 mm and a thickness of 0.3 mm to provide an anode.

Next, the cathode and the anode were laminated via a separator of a microporous polypropylene film with a diameter of 17 mm and a thickness of 0.25 mm. Then, the separator was immersed in a non-aqueous electrolytic solution to provide a coin-shaped non-aqueous electrolyte secondary battery. As the non-aqueous electrolytic solution, a solution was used in which $LiPF_6$ as a supporting electrolyte was dissolved at 1 mol/l in a mixed solvent containing ethylene carbonate and diethyl carbonate mixed at a mass ratio of 7:3.

Next, the coin-shaped non-aqueous electrolyte secondary battery obtained in this example was measured for its charge and discharge properties. Measurements were made with a voltage ranging from 1.5 to 4.5 V and a current density ranging from 0.1 to 10 $A/cm^2$ on Li at room temperature (25° C.) in the atmosphere.

Figure 3:
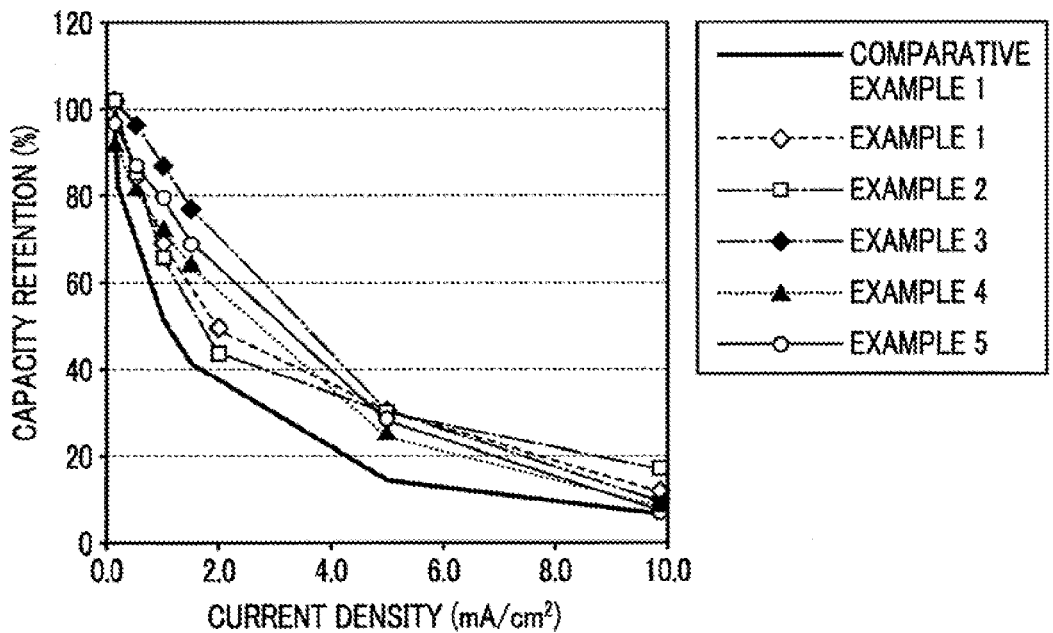
FIG. 3 is a graph showing the capacity retentions of the non-aqueous electrolyte secondary batteries using the mixed metal fluorides according to the present invention.
Figure 4:
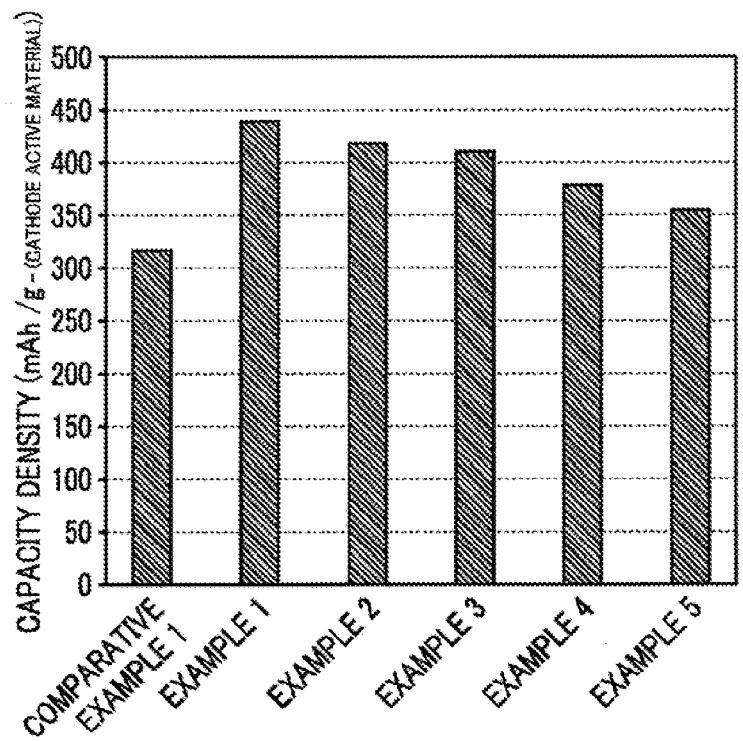
FIG. 4 is a graph showing the capacities of the non-aqueous electrolyte secondary batteries using the mixed metal fluorides according to the present invention.

Subsequently, to calculate the capacity retention at each current density, a capacity density value at a potential of 2.0 V in discharging at each current density was divided by the capacity density value at a potential of 2.0 V in discharging at a current density of 0.1 $A/cm^2$ and multiplied by 100. The result is shown in FIG. 3. FIG. 4 shows the discharge capacity of the coin-shaped non-aqueous electrolyte secondary battery obtained in this example.

Example 2

The powder of the mixed metal fluoride represented by the chemical formula $Fe_{0.99}Cu_{0.01}F_3$ was obtained just as in Example 1 except that copper nitrate was used in place of manganese nitrate, with the copper ion content set to 5% by mass based on the mass of iron ions. Table 1 shows the metal by which a part of Fe was substituted and the value of x for the mixed metal fluoride obtained in this example.

Next, the crystalline structure of the powder of $Fe_{0.99}Cu_{0.01}F_3$ was examined by X-ray diffraction. The result is shown in FIG. 2. It is clear from FIG. 2 that the powder of $Fe_{0.99}Cu_{0.01}F_3$ obtained in this example has a crystalline structure in which a part of Fe in $FeF_3$ having a perovskite structure has been substituted by Cu.

Then, a non-aqueous electrolyte secondary battery was produced using $Fe_{0.99}Cu_{0.01}F_3$ as a cathode active material just as in Example 1 except that the powder of $Fe_{0.99}Cu_{0.01}F_3$ obtained in this example was used.

Subsequently, charge and discharge properties were measured of the coin-shaped non-aqueous electrolyte secondary battery just as in Example 1 except that the coin-shaped non-aqueous electrolyte secondary battery obtained in this example was used. The capacity retention at each current density and the discharge capacity of the coin-shaped non-aqueous electrolyte secondary battery obtained in this example are shown in FIGS. 3 and 4, respectively.

Example 3

The powder of the mixed metal fluoride represented by the chemical formula $Fe_{0.99}Zn_{0.01}F_3$ was obtained just as in Example 1 except that zinc nitrate was used in place of manganese nitrate, with the zinc ion content set to 5% by mass based on the mass of iron ions. Table 1 shows the metal by which a part of Fe was substituted and the value of x for the mixed metal fluoride obtained in this example.

Next, the crystalline structure of the powder of $Fe_{0.99}Zn_{0.01}F_3$ obtained in this example was examined by X-ray diffraction. The result is shown in FIG. 2. It is clear from FIG. 2 that the powder of $Fe_{0.99}Zn_{0.01}F_3$ obtained in this example has a crystalline structure in which a part of Fe in $FeF_3$ having a perovskite structure has been substituted by Zn.

Then, a non-aqueous electrolyte secondary battery was produced using $Fe_{0.99}Zn_{0.01}F_3$ as a cathode active material just as in Example 1 except that the powder of $Fe_{0.99}Zn_{0.01}F_3$ obtained in this example was used.

Subsequently, charge and discharge properties were measured of the coin-shaped non-aqueous electrolyte secondary battery just as in Example 1 except that the coin-shaped non-aqueous electrolyte secondary battery obtained in this example was used. The capacity retention at each current density and the discharge capacity of the coin-shaped non-aqueous electrolyte secondary battery obtained in this example are shown in FIGS. 3 and 4, respectively.

Example 4

The powder of the mixed metal fluoride represented by the chemical formula $Fe_{0.883}Cr_{0.117}F_3$ was obtained just as in Example 1 except that chromium nitrate was used in place of manganese nitrate, with the chromium ion content set to 15% by mass based on the mass of iron ions. Table 1 shows the metal by which a part of Fe was substituted and the value of x for the mixed metal fluoride obtained in this example.

Next, the crystalline structure of the powder of $Fe_{0.883}Cr_{0.117}F_3$ obtained in this example was examined by X-ray diffraction. The result is shown in FIG. 2. It is clear from FIG. 2 that the powder of $Fe_{0.883}Cr_{0.117}F_3$ obtained in this example has a crystalline structure in which a part of Fe in $FeF_3$ having a perovskite structure has been substituted by Cr.

Then, a non-aqueous electrolyte secondary battery was produced using $Fe_{0.883}Cr_{0.117}F_3$ as a cathode active material just as in Example 1 except that the powder of $Fe_{0.883}Cr_{0.117}F_3$ obtained in this example was used.

Subsequently, charge and discharge properties were measured of the coin-shaped non-aqueous electrolyte secondary battery just as in Example 1 except that the coin-shaped non-aqueous electrolyte secondary battery obtained in this example was used. The capacity retention at each current density and the discharge capacity of the coin-shaped non-aqueous electrolyte secondary battery obtained in this example are shown in FIGS. 3 and 4, respectively.

Example 5

The powder of the mixed metal fluoride represented by the chemical formula $Fe_{0.983}Y_{0.017}F_3$ was obtained just as in Example 1 except that yttrium nitrate was used in place of manganese nitrate, with the yttrium ion content set to 5% by mass based on the mass of iron ions. Table 1 shows the metal by which a part of Fe was substituted and the value of x for the mixed metal fluoride obtained in this example.

Next, the crystalline structure of the powder of $Fe_{0.983}Y_{0.017}F_3$ obtained in this example was examined by X-ray diffraction. The result is shown in FIG. 2. It is clear from FIG. 2 that the powder of $Fe_{0.983}Y_{0.117}F_3$ obtained in this example has a crystalline structure in which a part of Fe in $FeF_3$ having a perovskite structure has been substituted by Y.

Then, a non-aqueous electrolyte secondary battery was produced using $Fe_{0.983}Y_{0.017}F_3$ as a cathode active material just as in Example 1 except that the powder of $Fe_{0.983}Y_{0.017}F_3$ obtained in this example was used.

Subsequently, charge and discharge properties were measured of the coin-shaped non-aqueous electrolyte secondary battery just as in Example 1 except that the coin-shaped non-aqueous electrolyte secondary battery obtained in this example was used. The capacity retention at each current density and the discharge capacity of the coin-shaped non-aqueous electrolyte secondary battery obtained in this example are shown in FIGS. 3 and 4, respectively.

TABLE 1

|  | Substitute metal | x |
|---|---|---|
| Example 1 | Mn | 0.04 |
| Example 2 | Cu | 0.01 |
| Example 3 | Zn | 0.01 |
| Example 4 | Cr | 0.117 |
| Example 5 | Y | 0.017 |

Comparative Example 1

The powder of the mixed metal fluoride represented by the chemical formula $FeF_3$ was obtained just as in Example 1 except that no manganese nitrate was used at all.

Next, the crystalline structure of the powder of $FeF_3$ obtained in this comparative example was examined by X-ray diffraction. The result is shown in FIG. 2. It is clear from FIG. 2 that the powder of $FeF_3$ obtained in this comparative example has a perovskite structure.

Then, a non-aqueous electrolyte secondary battery was produced using $FeF_3$ as a cathode active material just as in Example 1 except that the powder of $FeF_3$ obtained in this comparative example was used.

Subsequently, charge and discharge properties were measured of the coin-shaped non-aqueous electrolyte secondary battery just as in Example 1 except that the coin-shaped non-aqueous electrolyte secondary battery obtained in this comparative example was used. The capacity retention at each current density and the discharge capacity of the coin-shaped non-aqueous electrolyte secondary battery obtained in this comparative example are shown in FIGS. 3 and 4, respectively.

It is clear from FIG. 3 that the coin-shaped non-aqueous electrolyte secondary batteries using mixed metal fluorides obtained in Examples 1-5 as a cathode material can provide excellent charge and discharge properties in a high-current range with a current density of 5 mA/cm$^2$, compared to the coin-shaped non-aqueous electrolyte secondary batteries using $FeF_3$ obtained in Comparative Example 1 as a cathode material.

It is also clear from FIG. 3 that coin-shaped non-aqueous electrolyte secondary batteries using mixed metal fluorides obtained in Examples 1 and 2 as a cathode material can provide excellent charge and discharge properties even in a high-current range with a current density of 10 mA/cm$^2$, compared to the coin-shaped non-aqueous electrolyte secondary batteries using $FeF_3$ obtained in Comparative Example 1 as a cathode material.

It is also clear from FIG. 4 that the coin-shaped non-aqueous electrolyte secondary batteries using mixed metal fluorides obtained in Examples 1-5 have a large discharge capacity, compared to the coin-shaped non-aqueous electrolyte secondary batteries using $FeF_3$ obtained in Comparative Example 1 as a cathode material.

What is claimed is:

1. A cathode active material used for a secondary battery comprising a non-aqueous electrolyte, wherein the cathode active material consists of a mixed metal fluoride represented by the general formula:

$$Fe_{(1-x)}M_xF_3$$

where M is a metal element selected from the group consisting of Y, Mn, Cu, Zn, and Cr, and wherein x in the general formula of the mixed metal fluoride $Fe_{(1-x)}M_xF_3$ is in the range of $0.01 \leq x \leq 0.15$.

* * * * *